United States Patent
Bi et al.

(10) Patent No.: US 6,317,285 B1
(45) Date of Patent: Nov. 13, 2001

(54) METHOD FOR CALIBRATING MR HEAD GEOMETRY IN SELFSERVO WRITING DISC DRIVES

(75) Inventors: Qiang Bi; Kevin Arthur Gomez; Jimmy Tze Ming Pang; Stephen Kow Chiew Kuan; MengEng Lye; BengSee Lim, all of Singapore (SG)

(73) Assignee: Seagate Technology LLC

( * ) Notice: Subject to any disclaimer, the term of this patent is extended or adjusted under 35 U.S.C. 154(b) by 0 days.

(21) Appl. No.: 09/697,002

(22) Filed: Oct. 26, 2000

Related U.S. Application Data

(60) Provisional application No. 60/162,190, filed on Oct. 28, 1999.

(51) Int. Cl.⁷ .................................................. G11B 5/455
(52) U.S. Cl. ......................................... 360/75; 360/77.04
(58) Field of Search .................................. 360/75, 77.02, 360/77.04, 77.05, 77.08, 66, 313, 317, 318

(56) References Cited

U.S. PATENT DOCUMENTS

| | | |
|---|---|---|
| 4,802,033 | 1/1989 | Chi . |
| 4,890,172 | 12/1989 | Watt et al. . |
| 5,233,487 | 8/1993 | Christensen et al. . |
| 5,453,887 | 9/1995 | Negishi et al. . |
| 5,500,776 | 3/1996 | Smith . |
| 5,523,902 | 6/1996 | Pederson . |
| 5,570,244 | 10/1996 | Wiselogel . |
| 5,570,247 | 10/1996 | Brown et al. .......................... 360/75 |
| 5,606,469 | 2/1997 | Kosugi et al. . |
| 5,659,436 | 8/1997 | Yarmchuk et al. . |
| 5,757,574 | 5/1998 | Chainer et al. . |
| 5,793,554 | 8/1998 | Chainer et al. ......................... 360/75 |
| 5,867,343 | 2/1999 | Le et al. ............................. 360/77.08 |
| 5,875,064 | 2/1999 | Chainer et al. ......................... 360/75 |
| 5,940,240 | 8/1999 | Kupferman . |
| 5,946,158 | 8/1999 | Nazarian et al. . |
| 5,949,603 | * 9/1999 | Brown et al. .......................... 360/75 |
| 5,982,173 | 11/1999 | Hagen . |
| 5,991,115 | 11/1999 | Chainer et al. . |
| 6,049,440 | 4/2000 | Shu .................................... 360/77.04 |
| 6,061,201 | * 5/2000 | Woods .............................. 360/77.06 |
| 6,078,450 | 6/2000 | Chainer et al. . |
| 6,078,454 | * 6/2000 | Takahashi et al. ..................... 360/66 |
| 6,078,461 | 6/2000 | Smith et al. . |
| 6,091,564 | 6/2000 | Codilian et al. . |

* cited by examiner

*Primary Examiner*—David Hudspeth
*Assistant Examiner*—James L Habermehl
(74) *Attorney, Agent, or Firm*—Westman, Champlin & Kelly, P.A.

(57) ABSTRACT

A method of calibrating magnetoresistive (MR) head geometry for a product head in a selfservo writing disc drive includes the steps of writing a first burst at an inner diameter of a disc surface using the write head of the product head. Next, the first burst is read using the MR read head of the product head, and a first read amplitude of the first burst is determined. From the first read amplitude of the first burst, it is determined which one of a multiple different sets of subsequent inner diameter steps to perform. Then, the one of the multiple different sets of subsequent inner diameter steps is performed to determine a read head width, a write head width, and a read-write offset between the read head and the write head.

13 Claims, 8 Drawing Sheets

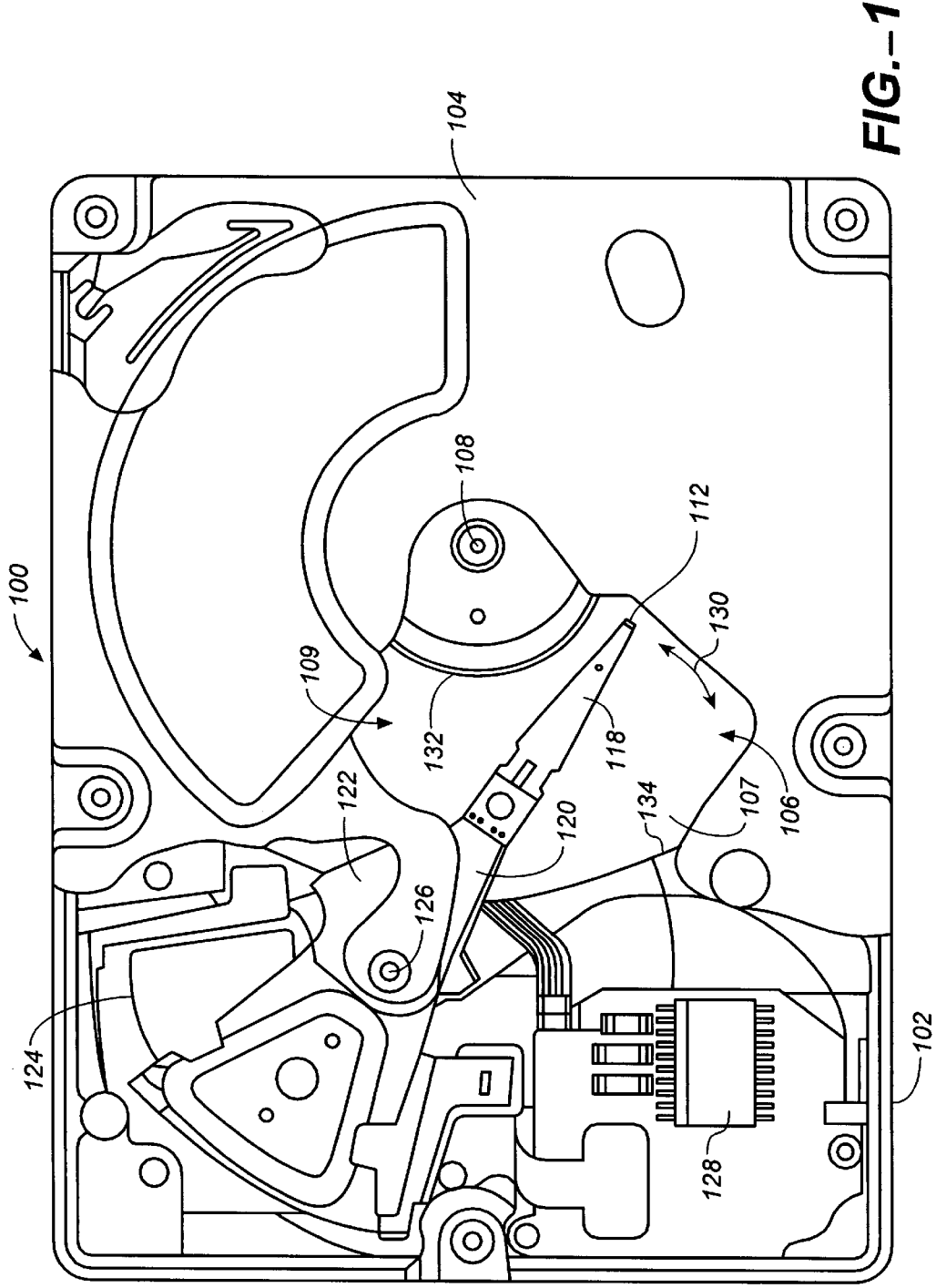
FIG._1

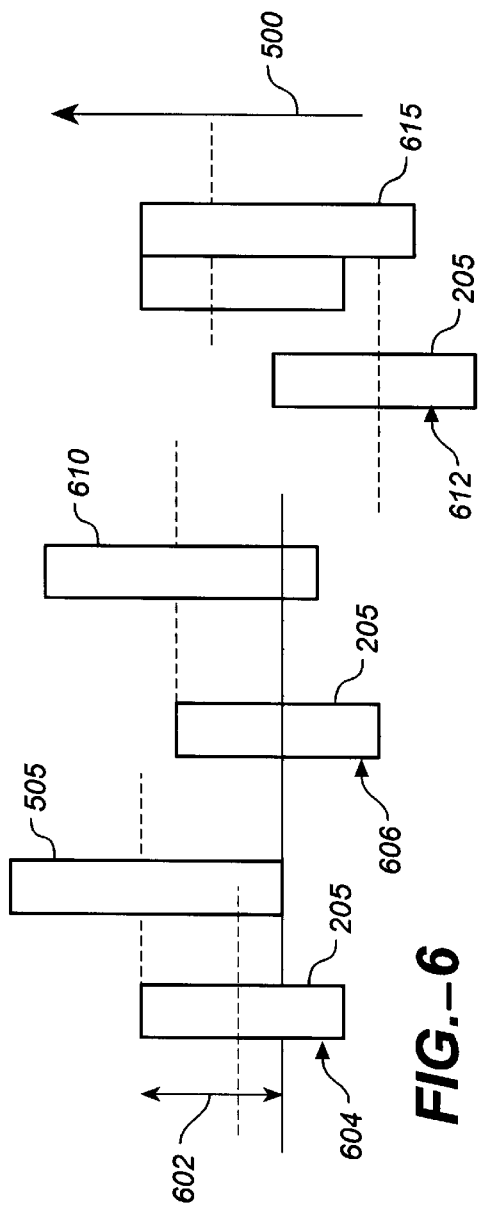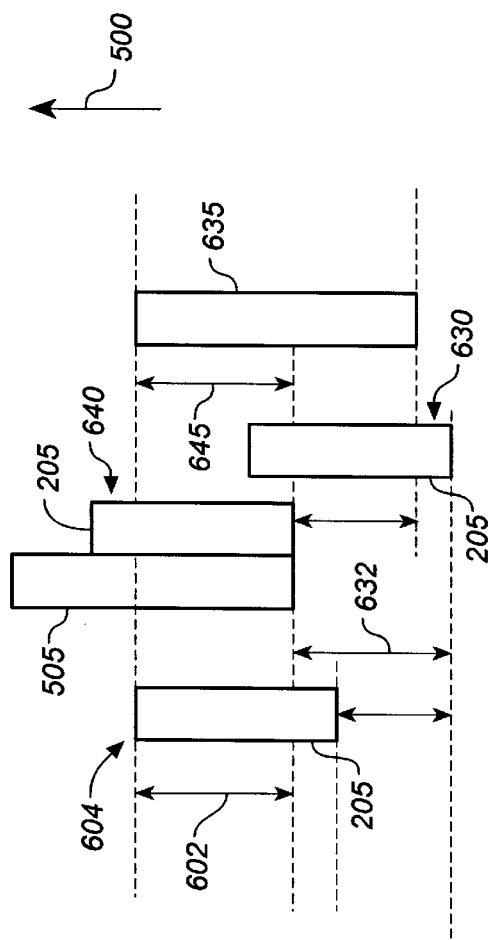

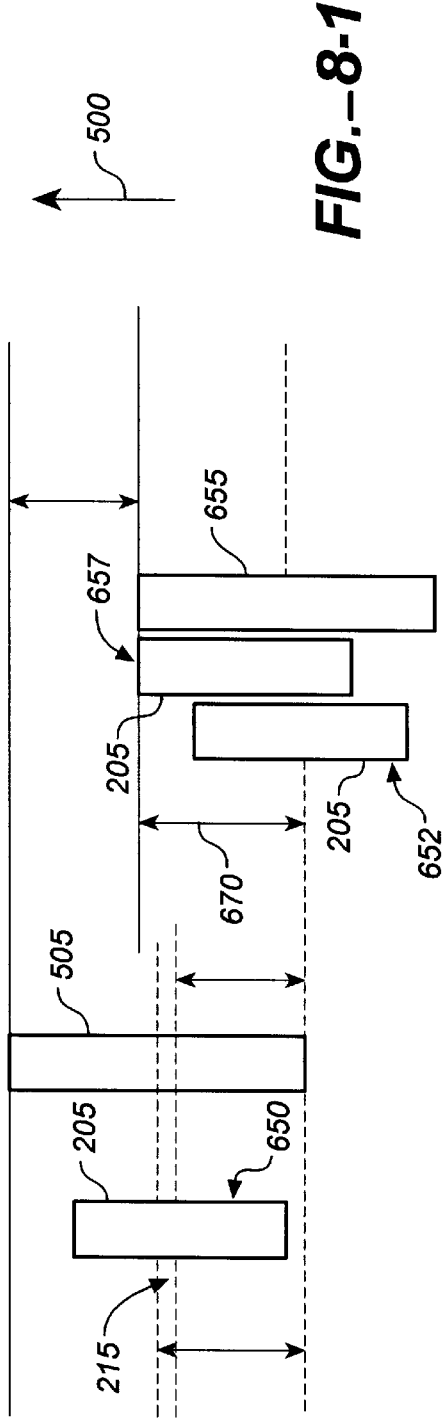

METHOD FOR CALIBRATING MR HEAD GEOMETRY IN SELFSERVO WRITING DISC DRIVES

CROSS-REFERENCE TO RELATED APPLICATION

This application claims priority from U.S. Provisional Application No. 60/162,190, filed Oct. 28, 1999, and entitled "SCHEME FOR CALIBRATING MR HEAD GEOMETRY IN SELFSERVO WRITING."

FIELD OF THE INVENTION

The present invention relates to methods for calibrating magnetoresistive (MR) head geometry. More particularly, the present invention relates to methods for calibrating MR head geometry in disc drives using selfservo writing.

BACKGROUND OF THE INVENTION

A typical disc drive storage system includes one or more magnetic discs which are mounted for co-rotation on a hub or spindle. A typical disc drive also includes a transducer supported by a hydrodynamic bearing which flies above each magnetic disc. The transducer and the hydrodynamic bearing are sometimes collectively referred to as a data head or a product head. A drive controller is conventionally used for controlling the disc drive based on commands received from a host system. The drive controller controls the disc drive to retrieve information from the magnetic discs and to store information on the magnetic discs. An electromechanical actuator operates within a negative feedback, closed-loop servo system to move the data head radially or linearly over the disc surface for track seek operations and holds the transducer directly above a desired track or cylinder on the disc surface for track following operations.

Often, the servo information used by the servo system is prerecorded on the disc surfaces during manufacture of the disc drive module using a process sometimes referred to as servo writing. Each disc drive module is mounted to a servo writer support assembly which precisely locates the disc surfaces relative to a reference or origin. The servo writer support assembly supports a position sensor such as laser light interferometer (for detecting the position of the actuator which locates the heads that perform servo track writing), and a push pin, driven by a servo writer voice coil, which positions the actuator itself. The position sensor is electrically inserted within the disc drive's negative feedback, closed-loop servo system for providing position information to the servo system while the servo data is being written to the disc surfaces. The servo writer support assembly may also support a clock writer transducer which writes a clock pattern onto the disc surface which is used for temporally spacing the servo data about the circumference of each track. A cleanroom is required during the servo writing process as the HDA needs to be unsealed to allow the clock head, push pin and laser to access the actuator and disk. This is to prevent particle contamination during servo writing. Servo track writer and cleanroom are very costly.

Another technique for writing servo information uses the disc drive itself to write the servo information in situ. In Situ recording means that the servo patterns are recorded on a fully assembled drive using the product head. This process is also referred to as selfservo writing. It removes the cleanroom requirement for conventional servo track writing, as the drive does not need to be open during the selfservo writing process. It also saves the conventional servo track writer cost. Calibration of product head geometry is important in both disc drives utilizing drive level servo implementations and in disc drives utilizing selfservo writing implementations. Measuring the width of the MR writer head or element helps in determining the widest head of the assembled drive, which in turn helps in determining the propagation step size in a checkerboard pattern of the type frequently used to implement selfservo systems. The read-write offset is an offset between a center line of the MR head and a center line of the writer head or element. In selfservo writing, measurement of the read-write offset helps in deciding where to write the next propagation burst. In conventional thin film head drives utilizing a single inductive element to read and write, the writer and reader are of the same width and there is no read-write offset. Thus, only the head width needs to be calibrated. In drives employing an MR read head, however, additional head parameters are critical, such as write head width, read head width and read-write offset.

Typically, calibration of MR head geometry at drive level is not difficult, because servo patterns are already available for position and displacement reference. However, in selfservo writing, there are no reference bursts or marks on the discs, which makes MR head calibration difficult. Moreover, due to quite large variations of the head specifications in drives, there exist different read-write offset cases at both the inner diameter (ID) and at the outer diameter (OD), which makes the calibration more complex. A method of calibrating MR head geometry using selfservo writing would be a significant improvement in the art.

SUMMARY OF THE INVENTION

The present invention relates to disc drive data storage systems which selfservo write without the use of pre-written reference bursts or marks on the disc surfaces of the drive.

In accordance with one embodiment of the present invention, a selfservo writing method of calibrating magnetoresistive (MR) head geometry for a product head in a disc drive includes the steps of writing a first burst at an inner diameter of a disc surface using the write head of the product head. Next, the first burst is read using the MR read head of the product head, and a first read amplitude of the first burst is determined. From the first read amplitude of the first burst, it is determined which one of a multiple different sets of subsequent inner diameter steps to perform. Then, the one of the multiple different sets of subsequent inner diameter steps is performed to determine a read head width, a write head width, and a read-write offset between the read head and the write head.

These and various other features as well as advantages which characterize the present invention will be apparent upon reading of the following detailed description and review of the associated drawings.

BRIEF DESCRIPTION OF THE DRAWINGS

FIG. 1 is a perspective view of a head disc assembly (HDA) with which the selfservo writing method of the present invention is useful.

FIGS. 3-1 and 3-2 are a block diagrams illustrating a method of the present invention of determining head geometries at an inner diameter.

FIGS. 4-1 and 4-2 are diagrammatic illustrations of steps for determining the product head geometries shown in FIG. 2.

FIG. 6 is a diagrammatic illustration of steps for determining the product head geometries at the inner diameter of the disc in accordance with a second case.

FIG. 7 is a diagrammatic illustration of alternate steps for determining the product head geometries at the inner diameter of the disc in accordance with the second case.

FIGS. 8-1 and 8-2 are diagrammatic illustrations for steps of determining product head geometries at the inner diameter of the disc in accordance with a third case.

DETAILED DESCRIPTION OF ILLUSTRATIVE EMBODIMENTS

Figures 1, 2, 3:
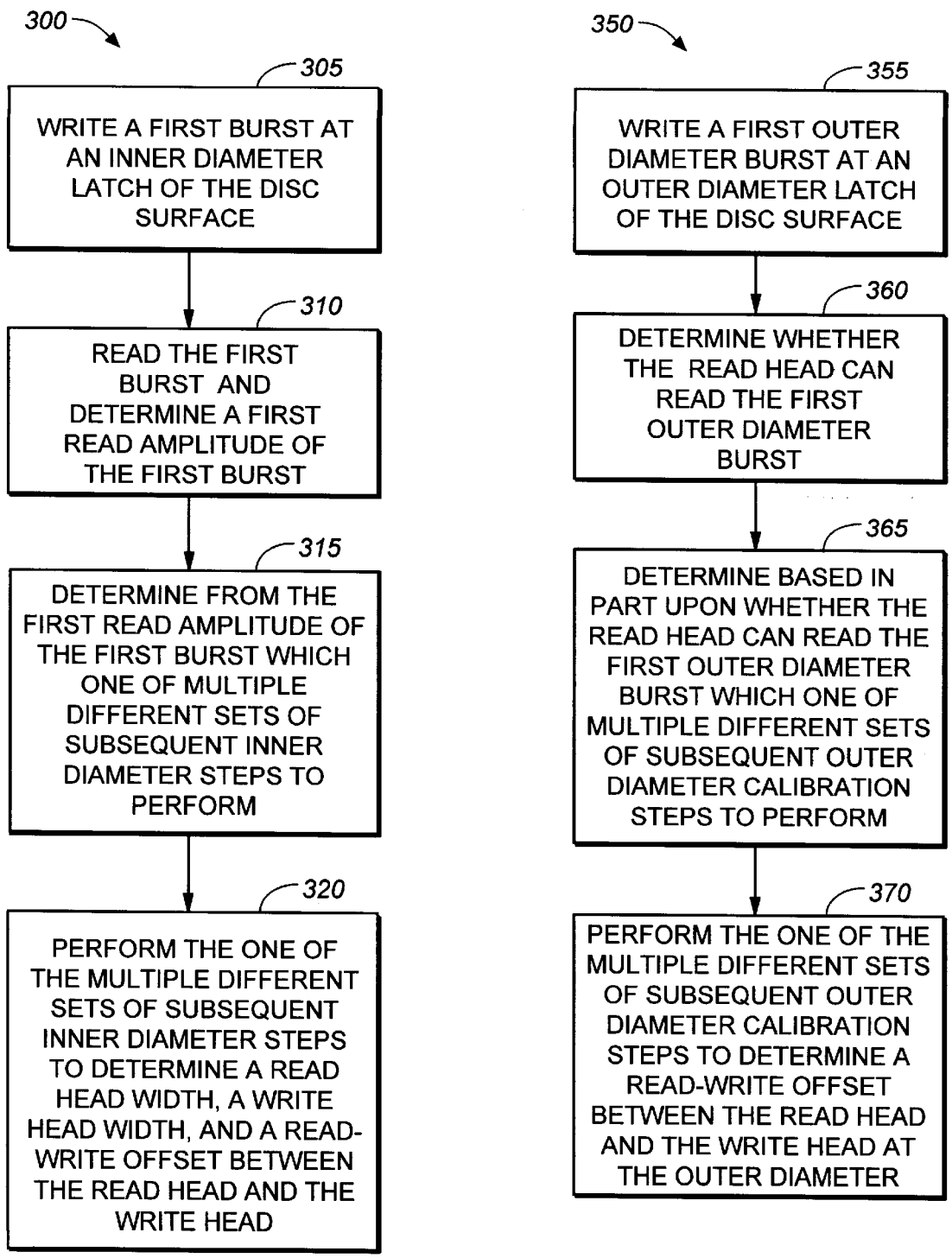

FIG. 1 is a plan view of a disc drive 100 which includes a housing with a base 102 and top cover 104 (sections of top cover 104 are removed for clarity). Disc drive 100 further includes a disc pack 106 which is mounted on a spindle motor (not shown). Disc pack 106 includes a plurality of individual discs 107 which are mounted for co-rotation about central axis 108. Each disc 107 has an associated product head 112 which carries one or more read and write transducers (read and write heads) for communicating with the disc surface 109. Each product head 112 is supported by a suspension 118 which is in turn attached to a track accessing arm 120 of an actuator assembly 122. Actuator assembly 122 is rotated about a shaft 126 by a voice coil motor 124, which is controlled by servo control circuitry within internal circuit 128, to move head 112 in an arcuate path 130 between a disc inner diameter 132 and a disc outer diameter 134. Disc drive 100 is adapted to implement selfservo writing methods of the present invention, and thus disc drive 100 can be referred to as a selfservo writing disc drive.

Figure 2:
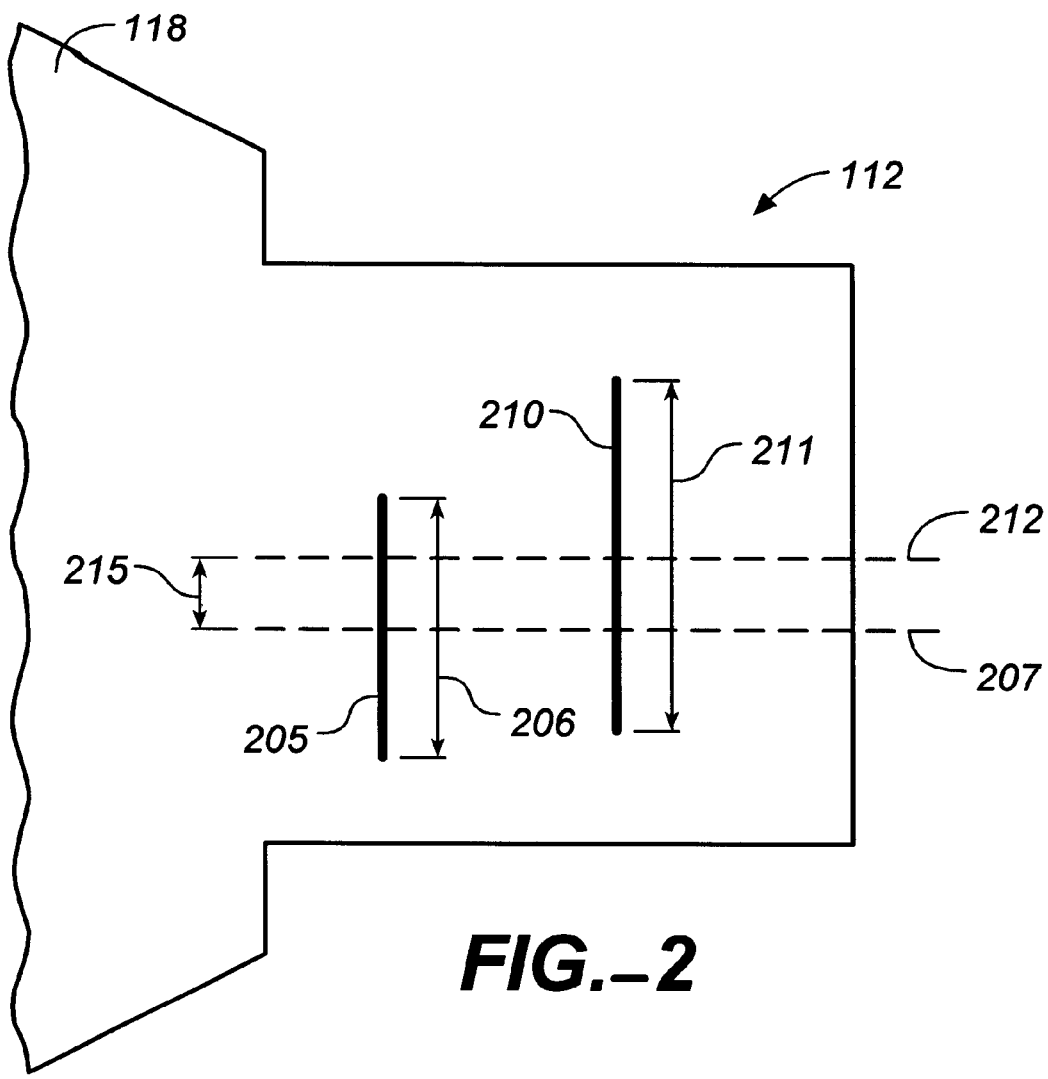
FIG. 2 is a diagrammatic illustration of the mechanical layout of a portion of the HDA illustrated in FIG. 1, including the read and write heads of one of the HDA's product heads, which illustrate various geometries to be determined.

FIG. 2 is a diagrammatic illustration of a portion of one product head 112 supported by suspension 118. Product head 112 includes MR read element or head 205 and inductive write element or head 210. MR read head 205 has a width R (referenced at 206), and is centered along its width about centerline 207. Write head 210 has a width W (referenced at 211), and is centered along its width about centerline 212. The read-write offset (referenced at 215) between MR read head 205 and write head 210 is a distance between centerlines 207 and 212. The method of the present invention is useful in selfservo writing disc drive 100 to determine the MR read head width R, the writer head width W, and the offset 215 between the MR read head 205 and the writer head 210.

FIG. 3-1 is a block diagram 300 illustrating first steps of a method of the present invention which disc drive 100 is adapted to implement. The method illustrated in FIG. 3-1 is a method of calibrating head geometries for product heads 112 in a selfservo writing disc drive. The write head 210 of each product head 112 is adapted to write servo bursts to a corresponding disc surface, while the MR read head 205 of each product head is adapted to read bursts from the corresponding disc surface. Prior to describing the method of the present invention, a discussion of some basic relationships is useful.

Figures 2, 4:
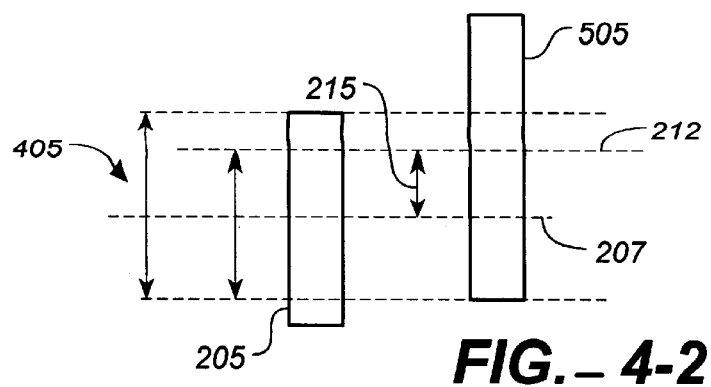
Figures 2, 4:
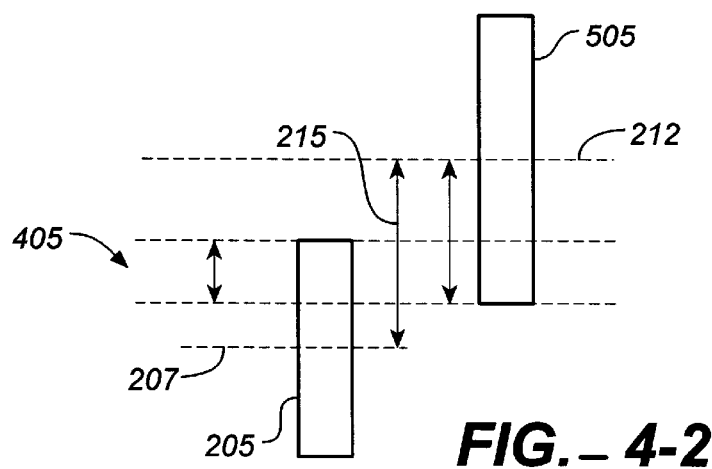

FIGS. 4-1 and 4-2 illustrate some basic relationships which are used to describe various steps and sub-steps of the method of the present invention. In these FIGS., MR read head 205 is represented as a first rectangle, while a second rectangle represents a burst 505 of data written by write head 210 on a surface of a disc. For purposes of conveniently describing methods of the present invention, the rectangle corresponding to the burst 505 written by write head 210 also represents a position of write head 210 relative to read head 205. At the position illustrated in FIGS. 4-1 and 4-2, suppose that the write head 210 writes a burst 505 and that the amplitude of the signal which the read head generates is a value X (designated as reference number 405). There are two cases for X 405. The first is illustrated in FIG. 4-2 and represents the case where X 405 is smaller than 50% of the full amplitude reading of the burst (i.e., less than 50% of the maximum possible amplitude reading which is proportional to width R 206 of the read head 205 shown in FIG. 2). The second case is illustrated in FIG. 4-1 and represents the case where X 405 is larger than 50% of the full amplitude reading of the burst, but smaller than 100% of the full amplitude reading of the burst. In both cases, we have the relationship described in Equation 1:

$$R/2 + W/2 - O = X \qquad \text{Equation 1}$$

where,
R stands for read head width 206;
W stands for write head width 211; and
O stands for read-write offset 215.

All of R, W and O are measured in reading amplitude. The full read amplitude of a burst is read when the read head is completely overlapped by the written burst. The read head width R and the write head width W (or write burst) are the longitudinal direction of the rectangle shown in FIGS. 4-1 and 4-2. In selfservo writing, the burst reading amplitude is used as a servo reference. For example, after writing a burst, to propagate (write) another burst, read head 205 may servo at positions which provide a reading amplitude of 50% of the full amplitude of the lower edge of the burst just written. Here, a reading amplitude of "50% of the full amplitude" is the servo reference, and is the burst amplitude a reader can "see". When read-write offset is taken into account in MR head cases, then the reference will be adjusted by the offset. Thus, the offset should share the same unit as that of reference which is the burst reading amplitude.

The Calibration Method

Although in the following method description the MR head is assumed to be ideal (i.e., the asymmetry, nonlinearity, and edge effects are ignored in the description), these effects can be taken into account by using some correcting factors on these parameters. The correcting factors can be obtained after propagating several tracks of bursts and recalibrating the head geometry. MR head calibration is carried out at the inner diameter (ID) first and then at the out diameter (OD).

Calibration at ID

Referring back to FIG. 3-1, as shown at block 305, the method of the invention first includes the step of writing a first servo burst at the latch of an inner diameter of the disc surface. Next, as shown at block 310, the method includes the step of reading the first burst and determining a first read amplitude of the first burst. As shown at block 315, the method next includes the step of determining from the first read amplitude of the first burst which one of multiple different sets of subsequent inner diameter calibration steps to perform. As shown at block 320, the method next includes the step of performing the one of the multiple different sets of subsequent inner diameter calibration steps to determine a read head width, a write head width, and a read-write offset between the read head and the write head.

In a typical drive design, the skew angle at the ID is smaller than at the OD. For example, the skew might be 5° at ID and 18° at OD. Generally speaking, the read-write offset at ID is smaller than that at OD. At ID, there exist four different orientations of read head 205 and write head 210, with each of these for cases being treated differently.

Figure 5:
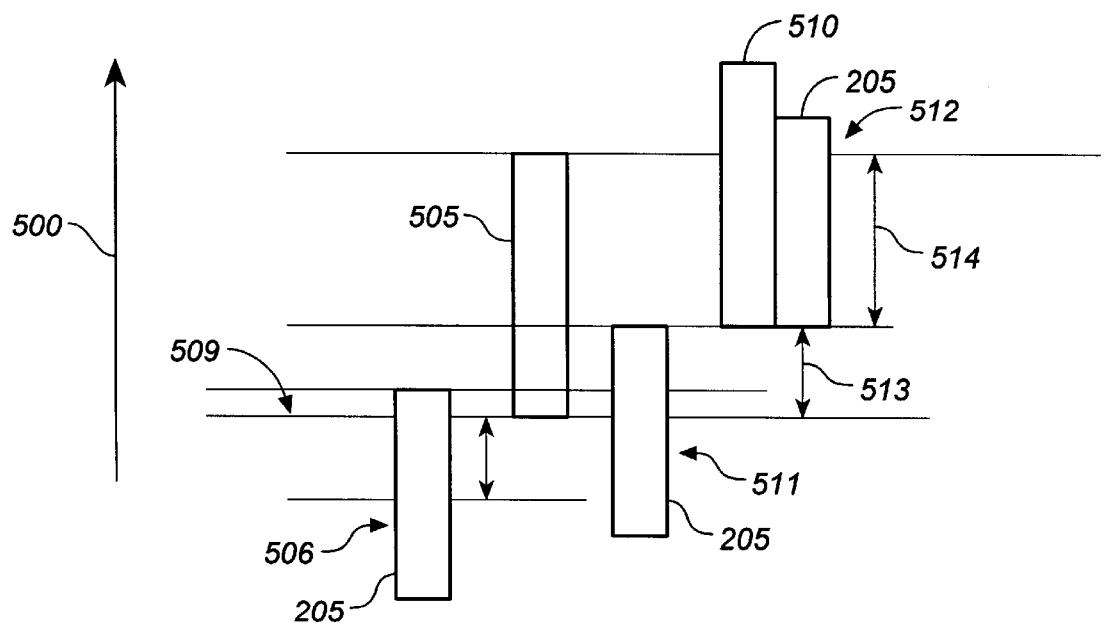
FIG. 5 is a diagrammatic illustration of steps for determining the product head geometries at an inner diameter of a disc in accordance with a first case.

ID Case 1: After Writing a Burst, Reader can Read Back<50% of Full Amplitude FIG. 5 is a diagrammatic illustration of a set of subsequent steps to be performed (block 320 of FIG. 3-1) when it is determined (block 315 of FIG. 3-1) that the first read amplitude of the first burst written at the ID is less than fifty percent of a full read amplitude. In FIGS. 5–12, the ID is in the direction pointed to by arrow 500, while the OD is in the opposite direction. As shown in FIG. 5, after writing the first burst W1 (diagrammatically illustrated at 505) this set of subsequent steps includes defining a value X1 (referenced at 509) as the first read amplitude of the first burst. It can be seen that value X1 509 is proportional to the overlap between the first written burst 505 and the initial position R1 506 of read head 205.

Next, read head 205 is moved toward a lower edge of the first burst W1 505 until the read amplitude of the first burst is fifty percent of the full read amplitude, and with the read head at that position 511 R2, a second burst W2 510 is written using the write head. Movement of read head 205 to position 511 can be achieved by moving read head 205 slowly toward its position corresponding to the actuator's location at the ID crashstop (the ID crashstop position of the head) to get full read amplitude value R. Then, read head 205 can be moved back toward the OD to servo at a position at the lower edge of first burst 505 which will result in a read amplitude of fifty percent of the full read amplitude R. At position R2 511, read head 505 reads the second burst 510, which should be X1 also. This can be used to improve the accuracy of the previous X1 reading. From position R1 to R2, the reader moves R/2-X1.

Next the read head 205 is moved toward the inner diameter crashstop position to a position 512 which starts to give a read amplitude equal to the full read amplitude R. At position 512, read head 205 reads the first burst W1 505 to determine a second read amplitude of the first burst, the second read amplitude of the first burst defining a value X2 (shown at 514). Movement of read head 205 to position 512 can be controlled by servoing on first burst W1 505, and changing the reference level (changing the percentage of burst 505 to servo on) and reading burst W2 510 until the read head gets to the desired position.

Finally, the write head width W (211 in FIG. 2) is calculated as a function of values X1 and X2, the read head width R (206 in FIG. 2) is calculated as a function of the full read amplitude, and the read-write offset 215 (FIG. 2) is calculated as a function of the write head width R, the read head width W, and the value X1. Equations 2–4 illustrate these relationships:

$$\text{Writer width} = X2 + (R/2 - X1) \qquad \text{Equation 2}$$

$$\text{Reader Width} = R \qquad \text{Equation 3}$$

$$\text{Offset} = W/2 + R/2 - X1 \qquad \text{Equation 4}$$

ID Case 2: After writing a Burst, Reader can Read Back>50% but<100% of Full Amplitude Solution 1

FIG. 6 is a diagrammatic illustration of a set of subsequent steps to be performed (block 320 of FIG. 3-1) when it is determined (block 315 of FIG. 3-1) that the first read amplitude of the first burst written at the ID is greater than fifty percent of the full read amplitude, but is still less than the full read amplitude. As shown in FIG. 6, after writing the first burst W1 (diagrammatically illustrated at 505) this set of subsequent steps includes defining a value X1 (referenced at 602) as the first read amplitude of the first burst WI 505 with read head 205 positioned at initial position R1 (referenced at 604). Next the read head 205 is moved slowly toward the ID crashstop position to a position which provides a full read amplitude value R from burst W1 505. Then, moving read head 205 to a position R2 (referenced at 606) servoing on fifty percent of full read amplitude R at the lower edge of burst W1 505, a second burst W2 (referenced at 610) is written. Next, read head 205 is moved slowly toward the ID crashstop position to a position at the upper edge (i.e., the ID edge) of burst W2 610 that stops giving the full read amplitude value R of burst W2 610. At this position, the read amplitude of first burst W1 505 is read. If the read amplitude is equal to the full read amplitude R, then servoing on a read amplitude of fifty percent of R at the lower edge of second burst W2 610, another burst is written. This process is repeated with the write head continuing to write additional bursts Wn (referenced at 615) until at position Rn (referenced at 612) of the read head, the read amplitude (Xn) from burst 505 W1 is smaller than R.

At position R1 604 and W1 550, $W/2 + R/2 - O = X1$. Each time, the read head moves (X1–R2). After n steps, the read head moves $(n-1)*(X1-R/2)$ to reach position Rn 612. When reader is at position 612, $W = nX + (n-1)*X1 - R/2)$. Equation 5 illustrates the write head width relationship, while Equations 3 and 4 again illustrate the read head width and read-write offset relationships.

$$\text{Writer width} = Xn + (n-1)*(X1 - R/2) \qquad \text{Equation 5}$$

Solution 2

FIG. 7 is a diagrammatic illustration of an alternate set of subsequent steps to be performed (block 320 of FIG. 3-1) when it is determined (block 315 of FIG. 3-1) that the first read amplitude of the first burst written at the ID is greater than fifty percent of the full read amplitude, but is still less than the full read amplitude. This alternate set of subsequent steps introduces less cumulative error and is simpler than the steps illustrated in FIG. 6. As shown in FIG. 7, after writing the first burst W1 (diagrammatically illustrated at 505) this set of subsequent steps includes defining a value X1 (referenced at 602) as the first read amplitude of the first burst with read head 205 positioned at initial position R1 (referenced at 604). Next, read head 203 is moved toward a lower edge of the first burst W1 505 until it reaches a position R2 (referenced at 630) at which the read amplitude 632 of the first burst is X1 less than the full read amplitude R. This can be implemented by moving read head 205 slowly from position R1 604 toward the ID crashstop position to get the full read amplitude value R from first burst W1 505. Then, the read head can servo on (R−X1) of the lower edge of burst W1 505. With the product head at this position, a second burst W2 (referenced at 635) is written on the disc surface.

Next, the read head 205 is moved toward the inner diameter crashstop to a position R3 (referenced at 640) at a lower edge of the first burst W1 505 at which the read amplitude of the first burst would just begin to be equal to the full read amplitude. At this position, the second burst W2 635 is read to determine a first read amplitude of the second burst. The first read amplitude of the second burst defines a value X2 (referenced at 645). Then, the write head width can be calculated as a function of values X1 and X2, the read head width can be calculated as a function of the full read amplitude R, and the read-write offset can be calculated as a function of the write head width, the read head width and the value X1. Equation 6 illustrates the write head width relationship, while Equations 3 and 4 again illustrate the read head and read-write offset relationships.

$$\text{Writer width} = X2 + (2 \cdot X1 - R) \quad \text{Equation 6}$$

ID Case 3: After Writing a Burst, Reader can Read Back 100% of Full Amplitude FIGS. 8-1 and 8-2 are a diagrammatic illustrations of a set of subsequent steps to be performed (block 320 of FIG. 3-1) when it is determined (block 315 of FIG. 3-1) that the first read amplitude of the first burst W1 505 written at the ID is equal to the full read amplitude R. The read head 205 is moved from initial position RI (referenced at 650) toward a position R2 (referenced at 652) at the lower edge of the first burst W1 505 until the read amplitude of the first burst is fifty percent of the fill read amplitude. Servoing at this position with a read amplitude of fifty percent of R at the lower edge of burst W1 505, a second burst W2 (referenced at 655) is written on the disc surface. The second burst W2 655 is read and its read amplitude from this position is determined. The read head 205 is then moved toward the inner diameter crashstop position to a position 657 at which the read amplitude of the second burst W2 655 stops being equal to the full read amplitude. At position 657, first burst W1 505 is again read to determine a second read amplitude of the first burst W1 505, with the second read amplitude 6f the first burst defining a value X2 (referenced at 670).

Next, read head 205 is moved to a position R3 (referenced at 672) at an upper edge of the first burst W2 505 at which the read amplitude of the first burst is fifty percent of the full read amplitude. With the read head servoing at this position 672, a third burst W3 (referenced at 675) is written on the disc surface. The third burst is read to determine a read amplitude of the third burst. After this, the read head is moved toward the outer diameter crashstop position to a position 677 at which the read amplitude of the third burst W3 675 begins to stop being equal to the full read amplitude. At this position, the first burst W1 505 is again read to determine a third read amplitude of the first burst, the third read amplitude of the first burst defining a value X3 (referenced at 680). Then, the write head width can be calculated as a function of values X2 and X3, the read head width can be calculated as a function of the full read amplitude, and the read-write offset can be calculated as a function of the values X2 and X3. While the width of the read head can again be determined using the relationship of Equation 3, the write head width and the read-write offset can be determined using the relationships of Equations 7 and 8.

$$\text{Writer width} = X2 + X3 \quad \text{Equation 7}$$

$$\text{Offset} = (X2 - X3)/2 \quad \text{Equation 8}$$

ID Case 4; After Writing a Burst, Reader Cannot Read the Burst

Figure 9:
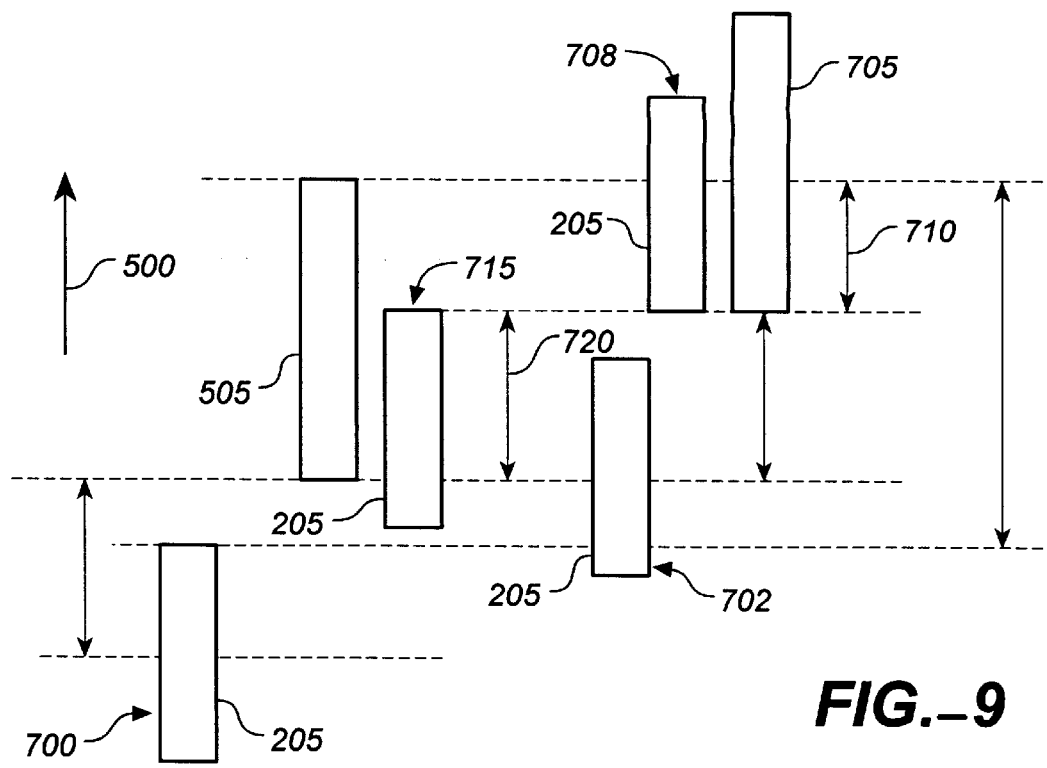
FIG. 9 is a diagrammatic illustration of steps for determining the product head geometries at the inner diameter of the disc in accordance with a fourth case.

There may exist the case that after writing a burst, the read head cannot read the burst just written, depending on the head parameters. However, the read-write offset will be fairly small due to the small skew angle at ID. FIG. 9 is a diagrammatic illustration of a set of subsequent steps to be performed (block 320 of FIG. 3-1) when it is determined (block 315 of FIG. 3-1) that the first read amplitude is approximately zero indicating that the read head cannot read the first burst. In this case, the subsequent steps include moving read head 205 from initial position R1 (referenced at 700) toward a lower edge of the first burst W1 505 until it reaches a position R2 (referenced at 702) at which the read amplitude of the first burst W1 505 is fifty percent of a full read amplitude. Servoing at this position, a second burst W2 (referenced at 705) is written on the disc surface. The second burst W2 705 is read to determine a read amplitude of the second burst. Next the read head is moved toward an inner diameter crashstop to a position 708 at a lower edge of the second burst W2 705 at which the read amplitude of the second burst would start to be equal to the full read amplitude. At this position, the first burst W1 505 is read to determine a second read amplitude of the first burst, with the second read amplitude of the first burst defining a value X1 (referenced at 710).

Next read head 205 is moved toward an outer diameter crashstop to a position 715 at which the read head begins to not be able to read any of the second burst W2 705. At this position the read head again reads the first burst W1 505 to determine a third read amplitude of the first burst, with the third read amplitude of the first burst defining a value X2 (referenced at 720). Then, the write head width can be calculated as a function of values X1 and X2, the read head width can be calculated as a function of the full read amplitude R, and the read-write offset can be calculated as a function of the write head width and the value X2. The read head width can again be determined using the relationship illustrated in Equation 3, while the write head width and the read-write offset can be determined using the relationships illustrated in Equations 9 and 10.

$$\text{Writer–width} = X1 + X2 \quad \text{Equation 9}$$

$$\text{Offset} = R/2 + W/2 + s = R/2 + W/2 + (X2 - R/2) = W/2 + X2 \quad \text{Equation 10}$$

Calibration at OD

After head calibration at the ID, read-write offset, read head width R and write head width W are known. With this head geometry knowledge at ID and with the information of skew angles of the disk drive actuator at ID and OD, the read-write offset at OD can be roughly estimated. At the OD, there exist three separate read-write offset cases which can be treated differently for further calibration of the product head at OD. FIG. 3-2 is a flow diagram 350 illustrating further steps of a method of the present invention which can be implemented after inner diameter calibration is completed. The additional method steps illustrated in FIG. 3-2 are for calibrating MR head OD geometries for product heads 112 in a selfservo writing disc drive.

As illustrated in block 355 of FIG. 3-2, the method includes writing a first outer diameter burst at an outer diameter of the disc surface. Next, as illustrated at block 360, the method includes the step of determining whether the read head 205 can read the first outer diameter burst. Then, as shown at block 365, the method includes the step of determining based in part upon whether the read head can read the first outer diameter burst which one of multiple different sets of subsequent outer diameter calibration steps to perform. Finally, as illustrated at block 370, the method includes performing the one of the multiple different sets of subsequent outer diameter calibration steps to determine a read-write offset between the read head and the write head at the outer diameter.

OD Case 1: Cannot Read the Burst Just Written
(W–R Offset Small, O<1.5 W)

Figure 10:
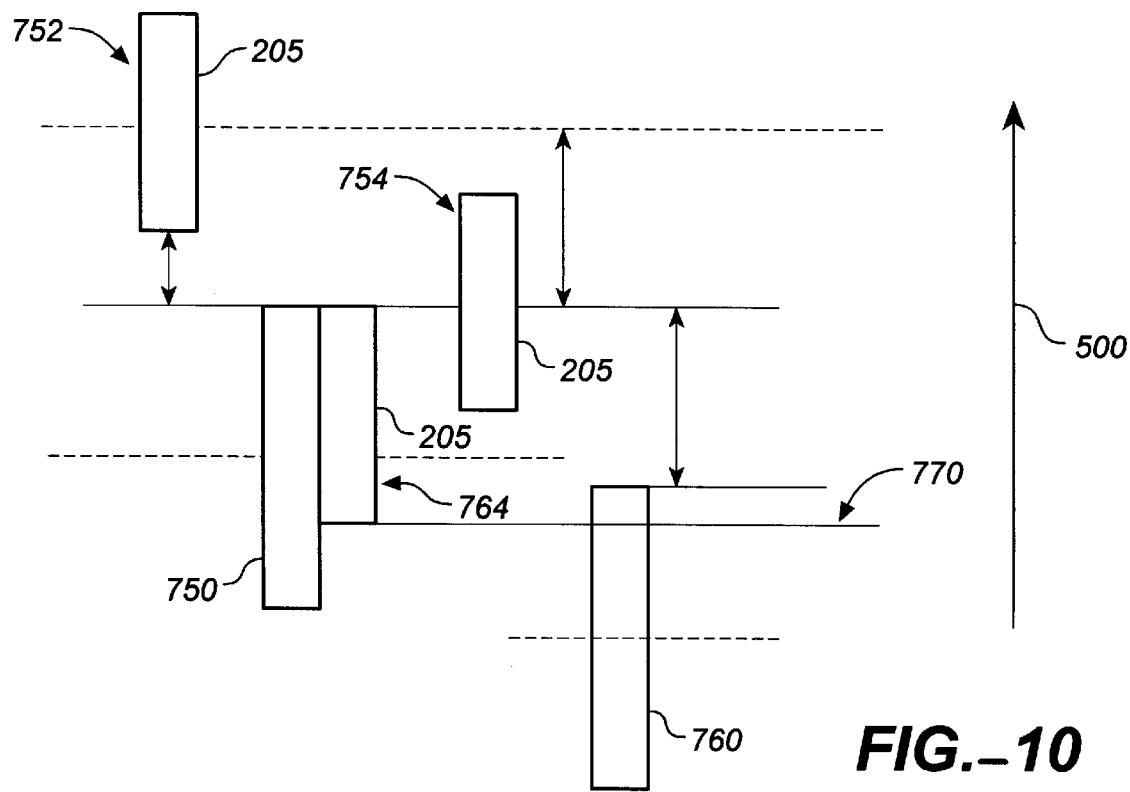
FIG. 10 is a diagrammatic illustration of steps for determining the product head geometries at an outer diameter of the disc in accordance with a first case.

FIG. 10 is a diagrammatic illustration of a set of subsequent outer diameter calibration steps to be performed if in step 365 it is determined that the read head 205 cannot read the first outer diameter burst W1 750 and if the read-write offset, roughly estimated from head geometry knowledge at ID and the skew angles at ID and OD, is less than 1.5 times the write head width. In this case, then step 370 includes moving the read head from initial position R1 (referenced at 752) toward the outer diameter and toward an upper edge of the first outer diameter burst W1 750 until the read head can read the first outer diameter burst and until the read head reaches a second position R2 (referenced at 752) at which the read amplitude of the first outer diameter burst W1 750 is fifty percent of a full read amplitude. Servoing on fifty percent of the full read amplitude of burst W1 750, a second outer diameter burst W2 (referenced at 760) is written on the disc surface.

Next, the read head 205 is moved toward the OD crashstop to a position 764 at a lower edge of the first outer diameter burst W1 750 at which the read amplitude of the first outer diameter burst starts to be equal to the full read amplitude. From this position, the second outer diameter burst W2 760 is read to determine a first read amplitude of the second outer diameter burst, with the first read amplitude of the second outer diameter burst defining a value X (referenced at 770). Using this information the read-write offset at the outer diameter is calculated as a function of the read head width R, the write head width W and the value X. Equations 11–13 illustrate these relationships.

Writer width=W     Equation 11

Reader Width=R     Equation 12

Offset=$W/2+R/2+s=W/2+R-X$     Equation 13

OD Case 2: Cannot Read the Burst Just Written
(W–R Offset Large O>1.5 W)

Figure 11:
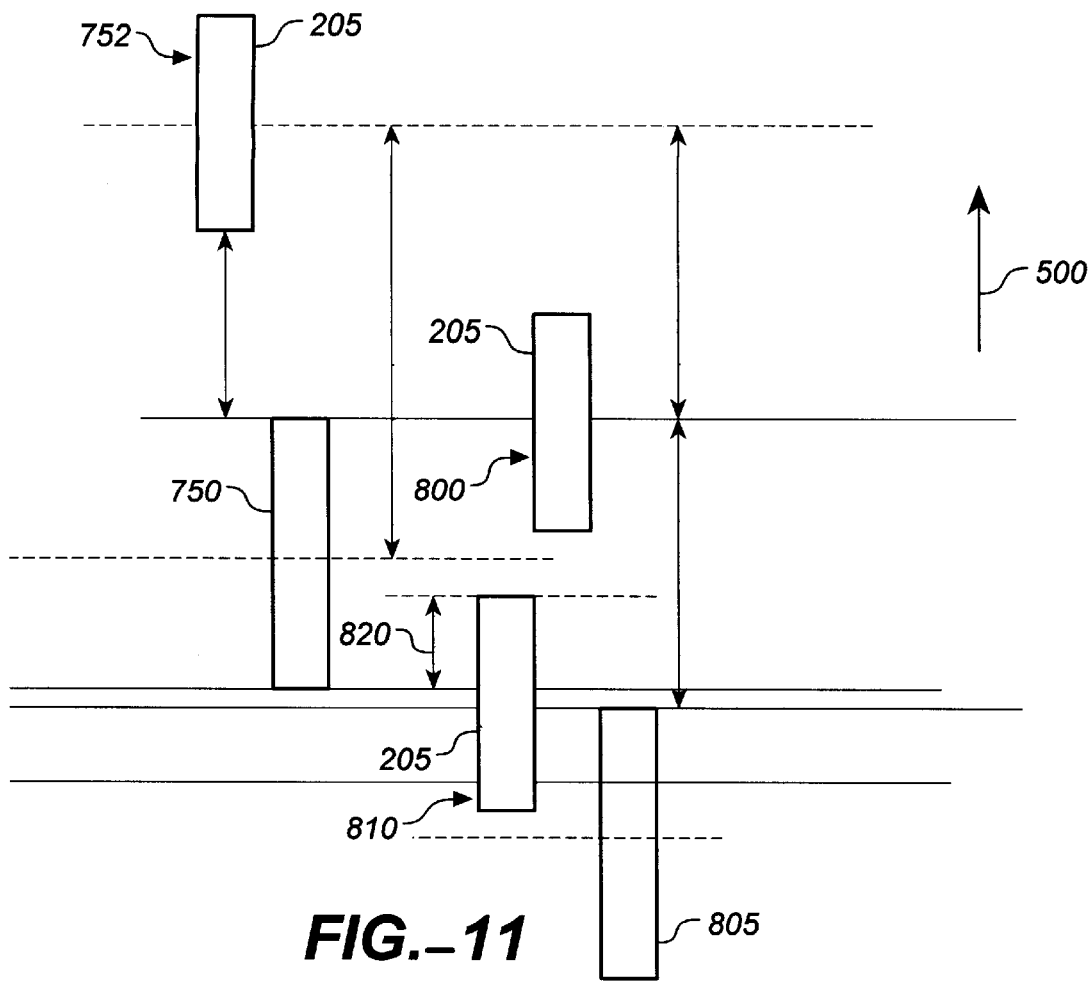
FIG. 11 is a diagrammatic illustration of steps for determining the product head geometries at the outer diameter of the disc in accordance with a second case.

FIG. 11 is a diagrammatic illustration of a set of subsequent outer diameter calibration steps to be performed if in step 365 it is determined that the read head 205 cannot read the first outer diameter burst W1 750 and if the read-write offset, roughly estimated from head geometry knowledge at ID and the skew angles at ID and OD, is greater than 1.5 times the write head width. In this case, then step 370 includes moving the read head from initial position R1 (referenced at 752) toward the outer diameter and toward an upper edge of the first outer diameter burst W1 750 until the read head can read the first outer diameter burst and to a position R2 (referenced at 800) at which the read amplitude of the first outer diameter burst W1 750 is fifty percent of a full read amplitude. At this position, a second outer diameter burst W2 (referenced at 805) is written on the disc surface.

Next, the read head is moved toward an outer diameter crashstop to a position 810 at an upper edge of the second outer diameter burst W2 800 at which a read amplitude of the second outer diameter burst is fifty percent of the full read amplitude. Servo at this position, the first outer diameter burst W1 750 is read to determine a first read amplitude of the first outer diameter burst, with the first read amplitude of the first outer diameter burst defining a value X (referenced at 820). Then, using this information, the read-write onset at the outer diameter is calculated as a function of the read head width, the write head width and the Value X. These relationships are illustrated in Equations 11 and 12 above, and in Equation 14 shown below.

Offset=$W/2+R/2+s=1.5*W+R/2-X$     Equation 14

OD Case 3: Can Read the Burst Just Written

Figure 12:
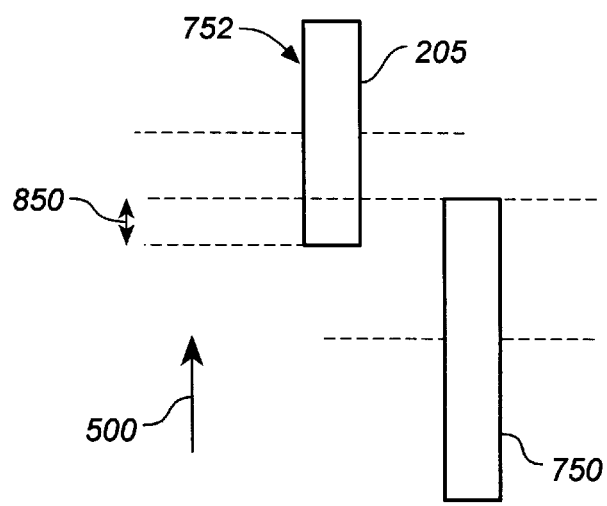
FIG. 12 is a diagrammatic illustration of steps for determining the product head geometries at the outer diameter of the disc in accordance with a third case.

FIG. 12 is a diagrammatic illustration of a set of subsequent outer diameter calibration steps to be performed if in step 365 it is determined that the read head 205 can read the first outer diameter burst W1 750. In this case, then step 370 includes reading the first outer diameter burst W1 750 with read head 205 at position 752 and determining a first read amplitude of the first outer diameter burst, with the first read amplitude of the first outer diameter burst defining a value X (referenced at 850). Then, the read-write offset at the outer diameter is calculated as a function of the read head width, the write head width and the value X, fore example using the relationships illustrated in Equations 11, 12 and 15.

Offset=$W/2+R/2-X$     Equation 15

After calibrating the write width, the read head width, and the read-write offsets at the ID and at the OD for each product head in the disc drive, the widest write head can be chosen. A table of read-write offsets can be generated. This can be done, for example, using the following step. For the chosen product head, linear interpolation between the determined ID read-write offset and the determined OD read-write offset is used to estimate the read-write offsets for positions between the ID and the OD. These estimated offsets are used to build up an offset table or to compute the offset on the fly. This process can be repeated for each product head.

Typically, at the ID, the write head lags the read head in the direction from ID to OD (i.e., the write head is closer to the ID than is the read head). If the lag-offset is small, it is still possible to propagate burst starting from ID and working toward the OD. However, it may be necessary to utilize some extra intermediate bursts to propagate properly. If the lag-offset is so large that after writing a burst, the read head cannot read it, then it becomes extremely difficult to propagate the bursts from the ID toward the OD using only a voice coil motor (VCM) controlled actuator. Dual stage actuators, including both a VCM controlled actuator and a piezo micro-actuator, may solve the problem. The situation is similar at the OD. At the OD, the write head typically lags the read head in the direction from the OD to the ID (i.e., the write head is closer to the OD than is the read head). Consequently, propagation starting from the OD and working toward the ID faces the same problems as those encountered when starting from ID. Prior to selfservo writing, a suitable middle diameter (MD) position for starting should be determined.

Generally, at some MD position, the write head leads the read head in the propagation direction by an amount that, after writing a burst, the read head can read at least part of the burst. It is possible to propagate bursts from this MD position to the ID and then from this MD position to the OD. Finding out the suitable position for starting the propagation is necessary.

If the read head 205 can read the full read amplitude of the burst just written, then the MD position is a good place to start propagation. At this position, then the steps for ID case 3 described above with reference to FIGS. 8-1 and 8-2 can be used to find out the offset O_MD at this MD position.

If the read head 205 can read some of the burst just written, the following relationships can be utilized. Suppose that a burst is written at a MD position and that the burst amplitude read by the read head 205 is X. Since the write head width and read head width are known, the read-write offset O_MD at this position can be determined using Equation 16.

$$O\_MD = W/2 + R/2 - X \qquad \text{Equation 16}$$

From O_MD, the MD position from ID or OD can be roughly estimated since the offset from ID to OD is monotonic and close to a linear relationship. Suppose offsets at ID and OD are O_ID and O_OD, respectively. The MD relative position from ID is then: (O_MD−O_ID)/(O_OD−O_ID). From this position, it can be determined whether it is a good place to start as described above.

If at the MD position, the read head cannot read a burst just written, then a different MD position must be selected.

For a single stage case, after finding out a suitable MD position, the write head can propagate bursts from MD to ID and from MD to OD using the normal MR selfservo propagation scheme since the read-write offset is small there and the read head can see a burst just written.

To summarize the above discussion, the present invention includes a method 300 (FIG. 3) of calibrating geometry for a product head 112 in a selfservo writing disc drive 100 (FIG. 1). The product head has a write head 210 (FIG. 2) adapted to write bursts to a corresponding disc surface, and a read head 205 adapted to read bursts from the corresponding disc surface. The method includes the step 305 of writing a first burst 505 at an inner diameter of the disc surface. Next, the method includes step 310 in which the read head is used to read the first burst 505, and a first read amplitude of the first burst is determined. Then, at step 315, it is determined from the first read amplitude of the first burst which one of multiple different sets of subsequent inner diameter steps to perform. Then, at step 320, the method includes performing the one of the multiple different sets of subsequent inner diameter steps to determine a read head width, a write head width, and a read-write offset between the read head and the write head.

The invention also includes a selfservo writing disc drive 100 which includes a disc 107 providing a disc surface 109. The disc drive 100 includes a product head 112 having a write head 210 and an MR read head 205. The disc drive includes an actuator 118,120,122 coupled to the product head and supporting the product head at positions adjacent the disc surface such that the product head can write bursts to the disc surface using the write head and read bursts from the disc surface using the MR read head. A motor 124 rotates the actuator to thereby move the product head to positions adjacent the disc surface between an ID (designated at direction 500) of the disc surface and an OD of the disc surface. A controller 128 is coupled to the motor and to the product head 112. The controller controls the motor in order to control positioning of the product head adjacent the disc surface 109, and the controls the product head in order to write servo bursts to the disc surface using the write head 210 and to read servo bursts from the disc surface using the read head 205. The controller is adapted to implement the steps 305, 310, 315 and 320 described above.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the selfservo writing disc drive while maintaining substantially the same functionality without departing from the scope and spirit of the present invention. In addition, although the preferred embodiment described herein is directed to a selfservo writing method for a disc drive data storage system, it will be appreciated by those skilled in the art that the teachings of the present invention can be applied to other systems, like optical storage systems, without departing from the scope and spirit of the present invention.

What is claimed is:

1. A method of calibrating magnetoresistive (MR) head geometry for a product head in a selfservo writing disc drive, the product head having a write head adapted to write bursts to a corresponding disc surface and a read head adapted to read bursts from the corresponding disc surface, the method comprising the steps of:

(A) writing a first burst at an inner diameter of the disc surface;

(B) reading the first burst and determining a first read amplitude of the first burst;

(C) determining from the first read amplitude of the first burst which one of a plurality of different sets of subsequent inner diameter steps to perform; and (D) performing the one of the plurality of different sets of subsequent inner diameter steps to determine a read head width, a write head width, and a read-write offset between the read head and the write head.

2. The method of claim 1, wherein if in step (C) it is determined that the first read amplitude of the first burst is less than fifty percent of a full read amplitude, then step (D) further includes performing a set of subsequent inner diameter steps comprising:

(D)(1) defining a value X1 as the first read amplitude of the first burst;

(D)(2) moving the read head toward a lower edge of the first burst until the read amplitude of the first burst is fifty percent of the full read amplitude;

(D)(3) writing a second burst on the disc surface;

(D)(4) reading the second burst and determining a read amplitude of the second burst;

(D)(5) moving the read head toward an inner diameter crashstop position until the read amplitude of the second burst is equal to the full read amplitude;

(D)(6) reading the first burst to determine a second read amplitude of the first burst, the second read amplitude of the first burst defining a value X2; and (D)(7) calculating the write head width as a function of values X1 and X2, calculating the read head width as a function of the full read amplitude, and calculating the read-write offset as a function of the write head width, the read head width and the value X1.

3. The method of claim 1, wherein if in step (C) it is determined that the first read amplitude of the first burst is greater than fifty percent of a full read amplitude but less than the full read amplitude, then step (D) further includes performing a set of subsequent inner diameter steps comprising:

(D)(1) defining a value X1 as the first read amplitude of the first burst;

(D)(2) moving the read head toward a lower edge of the first burst until the read amplitude of the first burst is X1 less than the full read amplitude;

(D)(3) writing a second burst on the disc surface;

(D)(4) moving the read head toward the inner diameter crashstop to a position at a lower edge of the first burst at which the read amplitude of the first burst begins to be equal to the full read amplitude;

(D)(5) reading the second burst to determine a first read amplitude of the second burst, the first read amplitude of the second burst defining a value X2; and (D)(6) calculating the write head width as a function of values X1 and X2, calculating the read head width as a function of the full read amplitude, and calculating the read-write offset as a function of the write head width, the read head width and the value X1.

4. The method of claim 1, wherein if in step (C) it is determined that the first read amplitude of the first burst is equal to a full read amplitude, then step (D) further includes performing a set of subsequent inner diameter steps comprising:

(D)(1) moving the read head toward a lower edge of the first burst until the read amplitude of the first burst is fifty percent of the full read amplitude;

(D)(2) writing a second burst on the disc surface;

(D)(3) reading the second burst and determining a read amplitude of the second burst;

(D)(4) moving the read head toward an inner diameter crashstop to a position at which the read amplitude of the second burst stops being equal to the full read amplitude;

(D)(5) reading the first burst to determine a second read amplitude of the first burst, the second read amplitude of the first burst defining a value X2;

(D)(6) moving the read head to a position at an upper edge of the first burst at which the read amplitude of the first burst is fifty percent of the fill read amplitude;

(D)(7) writing a third burst on the disc surface;

(D)(8) reading the third burst and determining a read amplitude of the third burst;

(D)(9) moving the read head toward the outer diameter crashstop to a position at which the read amplitude of the third burst begins to stop being equal to the full read amplitude;

(D)(10) reading the first burst to determine a third read amplitude of the first burst, the third read amplitude of the first burst defining a value X3; and (D)(11) calculating the write head width as a function of values X2 and X3, calculating the read head width as a function of the full read amplitude, and calculating the read-write offset as a function of the values X2 and X3.

5. The method of claim 1, wherein if in step (C) it is determined that the first read amplitude is approximately zero indicating that the read head cannot read the first burst, then step (D) further includes performing a set of subsequent inner diameter steps comprising:

(D)(1) moving the read head toward a lower edge of the first burst until the read amplitude of the first burst is fifty percent of a full read amplitude;

(D)(2) writing a second burst on the disc surface;

(D)(3) reading the second burst to determine a read amplitude of the second burst;

(D)(4) moving the read head toward an inner diameter crashstop to a position at a lower edge of the second burst at which the read amplitude of the second burst starts to be equal to the full read amplitude;

(D)(5) reading the first burst to determine a second read amplitude of the first burst, the second read amplitude of the first burst defining a value X1;

(D)(6) moving the read head toward an outer diameter crashstop to a position at which the read head begins to not be able to read any of the second burst;

(D)(7) reading the first burst to determine a third read amplitude of the first burst, the third read amplitude of the first burst defining a value X2; and (D)(8) calculating the write head width as a function of values X1 and X2, calculating the read head width as a function of the full read amplitude, and calculating the read-write offset as a function of the write head width and the value X2.

6. The method of claim 1, and after performing the one of the plurality of different sets of subsequent inner diameter steps, further comprising:

(E) writing a first outer diameter burst at an outer diameter of the disc surface;

(F) determining whether the read head can read the first outer diameter burst;

(G) determining based in part upon whether the read head can read the first outer diameter burst which one of a plurality of different sets of subsequent outer diameter calibration steps to perform; and (H) performing the one of the plurality of different sets of subsequent outer diameter calibration steps to determine a read-write offset between the read head and the write head at the outer diameter.

7. The method of claim 6, wherein if in step (F) it is determined that the read head cannot read the first outer diameter burst and if the read-write offset determined at the inner diameter is less than 1.5 times the write head width, then step (H) further includes performing a set of subsequent outer diameter calibration steps further comprising:

(H)(1) moving the read head toward the outer diameter and toward an upper edge of the first outer diameter burst until the read head can read the first outer diameter burst and until the read amplitude of the first outer diameter burst is fifty percent of a full read amplitude;

(H)(2) writing a second outer diameter burst on the disc surface;

(H)(3) moving the read head toward an outer diameter crashstop position to a position at a lower edge of the first outer diameter burst at which the read amplitude of the first outer diameter burst starts to be equal to the full read amplitude;

(H)(4) reading the second outer diameter burst to determine a first read amplitude of the second outer diameter burst, the first read amplitude of the second outer diameter burst defining a value X; and (H)(5) calculating the read-write offset at the outer diameter as a function of the read head width, the write head width and the value X.

8. The method of claim 6, wherein if in step (F) it is determined that the read head cannot read the first outer diameter burst and if the read-write offset determined at the inner diameter is greater than 1.5 times the write head width, then step (H) further includes performing a set of subsequent outer diameter calibration steps further comprising:
   (H)(1) moving the read head toward the outer diameter and toward an upper edge of the first outer diameter burst until the read head can read the first outer diameter burst and until the read amplitude of the first outer diameter burst is fifty percent of a full read amplitude;
   (H)(2) writing a second outer diameter burst on the disc surface;
   (H)(3) moving the read head toward an outer diameter crashstop position to a position at an upper edge of the second outer diameter burst at which a read amplitude of the second outer diameter burst is fifty percent of the fill read amplitude;
   (H)(4) reading the first outer diameter burst to determine a first read amplitude of the first outer diameter burst, the first read amplitude of the first outer diameter burst defining a value X; and
   (H)(5) calculating the read-write offset at the outer diameter as a function of the read head width, the write head width and the value X.

9. The method of claim 6, wherein if in step (F) it is determined that the read head can read the first outer diameter burst, then step (H) further includes performing a set of subsequent outer diameter calibration steps further comprising:
   (H)(1) reading the first outer diameter burst and determining a first read amplitude of the first outer diameter burst, the first read amplitude of the first outer diameter burst defining a value X; and
   (H)(2) calculating the read-write offset at the outer diameter as a function of the read head width, the write head width and the value X.

10. The method of claim 6, and further comprising repeating steps (A) through (H) for each product head in the selfservo writing disc drive to calculate the write head width, the read head width, and the read-write offset at each of the inner diameter and the outer diameter for each product head.

11. The method of claim 10, and further comprising the steps of:
   identifying a middle diameter position on each disc surface of the disc drive where for the corresponding product head the write head leads the read head in a propagation direction;
   propagating servo bursts on each disc surface from the corresponding middle diameter position to the inner diameter of the disc surface and from the corresponding middle diameter position to the outer diameter of the disc surface.

12. A selfservo writing disc drive comprising:
   a disc providing a disc surface;
   a product head having a write head and a magnetoresistive (MR) read head;
   an actuator coupled to the product head and supporting the product head at positions adjacent the disc surface such that the product head can write bursts to the disc surface using the write head and read bursts from the disc surface using the MR read head;
   a motor for rotating the actuator to thereby move the product head to positions adjacent the disc surface between an inner diameter (ID) of the disc surface and an outer diameter (OD) of the disc surface; and
   a controller coupled to the motor and to the product head, the controller controlling the motor in order to control positioning of the product head adjacent the disc surface, and the controller controlling the product head in order to write servo bursts to the disc surface using the write head and to read servo bursts from the disc surface using the read head, the controller being adapted to implement the steps comprising:
   (A) writing a first burst at an inner diameter of the disc surface using the write head;
   (B) reading the first burst using the read head and determining a first read amplitude of the first burst;
   (C) determining from the first read amplitude of the first burst which one of a plurality of different sets of subsequent inner diameter steps to perform; and
   (D) performing the one of the plurality of different sets of subsequent inner diameter steps to determine a read head width, a write head width, and a read-write offset between the read head and the write head.

13. A selfservo writing disc drive comprising:
   a disc providing a disc surface;
   a product head having a write head and a magnetoresistive (MR) read head; and
   means for controlling the product head to implement steps comprising:
   (A) writing a first burst at an inner diameter of the disc surface using the write head;
   (B) reading the first burst using the read head and determining a first read amplitude of the first burst;
   (C) determining from the first read amplitude of the first burst which one of a plurality of different sets of subsequent inner diameter steps to perform; and
   (D) performing the one of the plurality of different sets of subsequent inner diameter steps to determine a read head width, a write head width, and a read-write offset between the read head and the write head.

* * * * *

UNITED STATES PATENT AND TRADEMARK OFFICE
CERTIFICATE OF CORRECTION

PATENT NO.    : 6,317,285 B1
DATED         : November 13, 2001
INVENTOR(S)   : Qiang Bi et al.

It is certified that error appears in the above-identified patent and that said Letters Patent is hereby corrected as shown below:

<u>Title page,</u>
Item [75], Inventors, delete "MengEng" and insert -- Meng Eng --.
Item [75], Inventors, delete "BengSee" and insert -- Beng See --.

<u>Column 13,</u>
Line 46, delete "fill" and insert -- full --.

<u>Column 15,</u>
Line 18, "fill" and insert -- full --.

Signed and Sealed this

Ninth Day of April, 2002

Attest:

JAMES E. ROGAN
*Attesting Officer*   *Director of the United States Patent and Trademark Office*